US009565278B2

(12) United States Patent
Yoo et al.

(10) Patent No.: US 9,565,278 B2
(45) Date of Patent: Feb. 7, 2017

(54) METHOD FOR MANUFACTURING MOBILE TERMINAL AND LIGHT GUIDE UNIT

(71) Applicant: LG ELECTRONICS INC., Seoul (KR)

(72) Inventors: Joonhee Yoo, Seoul (KR); Hosang Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/024,237

(22) PCT Filed: Nov. 13, 2013

(86) PCT No.: PCT/KR2013/010272
§ 371 (c)(1),
(2) Date: Mar. 23, 2016

(87) PCT Pub. No.: WO2015/046663
PCT Pub. Date: Apr. 2, 2015

(65) Prior Publication Data
US 2016/0234357 A1    Aug. 11, 2016

(30) Foreign Application Priority Data
Sep. 24, 2013 (KR) .................. 10-2013-0113149

(51) Int. Cl.
*H04M 1/00* (2006.01)
*H04M 1/02* (2006.01)
(Continued)

(52) U.S. Cl.
CPC ............ *H04M 1/0202* (2013.01); *G02B 6/006* (2013.01); *G02B 6/0043* (2013.01); *G02B 6/0055* (2013.01);
(Continued)

(58) Field of Classification Search
CPC ..... G02B 6/0051; G02B 6/0036; G02B 6/006; G02B 6/0065; G02B 6/0055; G02B 6/0043; G02B 6/0018; H01H 37/54; H01H 37/10; H01H 13/83; H01H 2219/044; H04B 1/38; H04B 1/3833; H04B 1/383; H04M 1/0202; H04M 1/22; H02B 6/006
(Continued)

(56) References Cited

U.S. PATENT DOCUMENTS 5,779,337 A * 7/1998 Saito .................... G02B 6/0038
362/23.15
5,834,850 A * 11/1998 Hotta .................... H01L 21/565
257/687
(Continued)

FOREIGN PATENT DOCUMENTS

JP       2004-127810 A    4/2004
KR   10-2008-0094149 A   10/2008
(Continued)

*Primary Examiner* — Mahendra Patel
(74) *Attorney, Agent, or Firm* — Birch, Stewart, Kolasch & Birch, LLP

(57) ABSTRACT

Disclosed is a mobile terminal comprising: a case for mounting electronic components therein; a light source located within the case, for laterally emitting light; and a light guide unit in which light emitted from the light source is incident on the lateral side, wherein the light guide unit comprises a base module and a reflective film, which is coated on the outer side of the base module and includes a first opening formed on the side facing the light source and a second opening formed in the direction of the front side, wherein the case includes a light transmission unit in a portion facing the second opening of the reflective film and wherein the reflective film encloses the lateral side of the mobile terminal so that even the lateral leakage of light can be blocked.

14 Claims, 14 Drawing Sheets

(51) Int. Cl.
  *H04B 1/3827* (2015.01)
  *H04M 1/22* (2006.01)
  *F21V 8/00* (2006.01)

(52) U.S. Cl.
  CPC .......... *G02B 6/0065* (2013.01); *H04B 1/3833* (2013.01); *H04M 1/22* (2013.01); *G02B 6/0051* (2013.01)

(58) Field of Classification Search
  USPC ...................................................... 455/575.1
  See application file for complete search history.

(56) References Cited

U.S. PATENT DOCUMENTS

| | | | | |
|---|---|---|---|---|
| 8,905,610 | B2* | 12/2014 | Coleman | G02B 6/0018 362/554 |
| 9,077,791 | B2* | 7/2015 | Jeong | G06F 1/1637 |
| 2003/0218264 | A1* | 11/2003 | Akanabe | B29D 11/00432 264/2.5 |
| 2004/0185187 | A1* | 9/2004 | Yokoyama | B24B 37/042 428/1.5 |
| 2006/0002146 | A1* | 1/2006 | Baba | G02B 6/0021 362/613 |
| 2006/0260922 | A1* | 11/2006 | Lee | H01H 13/83 200/314 |
| 2008/0257699 | A1* | 10/2008 | Sung | H01H 13/83 200/314 |
| 2009/0040785 | A1* | 2/2009 | Shimura | G02B 6/0035 362/609 |
| 2009/0135150 | A1* | 5/2009 | Takashima | G06F 3/041 345/173 |
| 2010/0008103 | A1* | 1/2010 | Lee | G02B 6/0021 362/621 |
| 2010/0102485 | A1* | 4/2010 | Chen | B29D 11/00663 264/328.1 |
| 2011/0007493 | A1* | 1/2011 | Ishio | G02F 1/133606 362/97.1 |
| 2013/0120995 | A1* | 5/2013 | Sato | F21V 21/088 362/249.02 |

FOREIGN PATENT DOCUMENTS

| | | |
|---|---|---|
| KR | 10-2010-0006328 A | 1/2010 |
| KR | 10-0940972 B1 | 2/2010 |
| KR | 10-2010-0062556 A | 6/2010 |

\* cited by examiner

METHOD FOR MANUFACTURING MOBILE TERMINAL AND LIGHT GUIDE UNIT

CROSS-REFERENCE TO THE RELATED APPLICATIONS

This application is the National Phase of PCT International Application No. PCT/KR2013/010272, filed on Nov. 13, 2013, which claims priority under 35 U.S.C. §119(a) to Patent Application No. 10-2013-0113149, filed in the Republic of Korea on Sep. 24, 2013, all of which are hereby expressly incorporated by reference into the present application.

BACKGROUND OF THE INVENTION

Field of the Invention

Embodiments of the present invention relate to a mobile terminal including a light guide unit with a simple structure and a method for manufacturing the mobile terminal.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

As such functions become more diversified, the mobile terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Many components have to be mounted in the mobile terminal for diverse functions. Accordingly, the sizes of the internal components have to become small and the manufacturing price has to be lowered. In addition, the processes required to fabricate such a mobile terminal have to be simplified.

A conventional light guide unit 10 shown in FIG. 15 includes a light guide film 11, a white film 13 and a reflection film 14 bonded to upper and lower surfaces of the light guide film 11, respectively, using bond 12 and a printed circuit board 185 and a case 109 bonded to the white film, using a double-sided tape 15.

To dispose several layers 11, 13 and 14, adhesive 12 and 15 has to be applied several times, thereby complicating processes and increasing expense and thickness. There is one advantage that light escapes in a lateral direction as shown in FIG. 15.

SUMMARY OF THE INVENTION

To overcome the disadvantages, an object of the present invention is to provide a mobile terminal which is able to be manufactured easily, with a slim thickness, by simplifying a structure of a light guide unit used in emitting light such as a button, an indicator and the like.

To achieve these objects and other advantages and in accordance with the purpose of the embodiments, as embodied and broadly described herein, a mobile terminal includes a case having electronic components mounted therein; a light source arranged in the case and configured to emit light in a lateral direction; and a light guide unit configured to have the light emitted from the light source incident thereon, wherein the light guide unit comprises a base module; and a reflection film coated on an outer surface of the base module and comprising a first opening fotined in a surface facing the light source and a second opening formed toward a front surface of the light guide unit, and the case comprises a light transmission unit facing the second opening of the reflection film.

The light guide unit may have an area projected in a lateral direction, corresponding to the second opening of the reflection film.

The height of the second opening formed in the reflection film may be smaller than the height of the light guide unit.

A plurality of uneven portions may be formed in a bottom surface of the light guide unit.

One or more of the second opening and the light transmission may be formed in a character or figure shape.

The mobile terminal may further comprise a white sheet disposed between a front surface of the light guide unit and the case.

One or more of the corners of the light guide unit may cut away obliquely.

The reflection film may be formed by coating tin or aluminum in a non-conductive vapor metallization (NCVM) method.

In another aspect of the present disclosure, a method for manufacturing a light guide unit comprises steps of injection-molding a transparent injection mold comprising a temporary fixing unit and a plurality of base modules having one surface of which a predetermined portion is connected to the temporary fixing unit and the other surfaces exposed outside; coating a reflection film on a surface of the transparent injection mold; partially removing the reflection film formed in the front surface of the transparent injection mold; and cutting away a connecting portion between the base module and the temporary fixing unit.

The connecting portion may be thinner than the base module.

The plurality of the base modules may be arranged in a line.

The temporary fixing unit may be a bar type, and the plurality of the base modules are connected to right and left portions of the temporary fixing unit.

The injection molding step may inject injection solution to a mold having a cavity formed corresponding to the shape of the transparent injection mold, and a plurality of unevenness may be formed in the mold, corresponding to the uneven portions formed in the bottom surface of the base module.

The mold may be a detachable assembly mold having the unevenness detachable there from.

The reflection film coating step may coat tin or aluminum according to non-conductive vapor metallization (NCVM).

The step of partially removing the reflection film may be performed according to laser etching.

In a further aspect of the present disclosure, a method for manufacturing a light guide unit includes steps of injection-molding a transparent injection mold comprising a temporary fixing unit and a plurality of base modules having one surface of which a predetermined portion is connected to the temporary fixing unit and the other surfaces exposed outside; coating a reflection film on a surface of the transparent injection mold; partially removing the reflection film formed in the front surface of the transparent injection mold; forming a light guide unit by cutting away a connecting portion between the base module and the temporary fixing unit; disposing a light source facing a cut-away portion of the light guide unit and the light guide unit to make the laser-processed portion toward a front surface; and coupling a front case to the rear case to locate a light transmission unit in the laser-processed portion.

According to at least one of the embodiments of the present disclosure, the reflection film may cover even the lateral surface of the light guide unit and even the light escaping in a lateral direction may be guided.

Moreover, no adhesive layer needs to be disposed and the processes may be simplified. The overall thickness of the light guide unit can be reduced and the plurality of the light guide units may be manufactured at one time. Accordingly, the production cost can be lowered.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

DETAILED DESCRIPTION OF THE EMBODIMENTS

Figure 1:
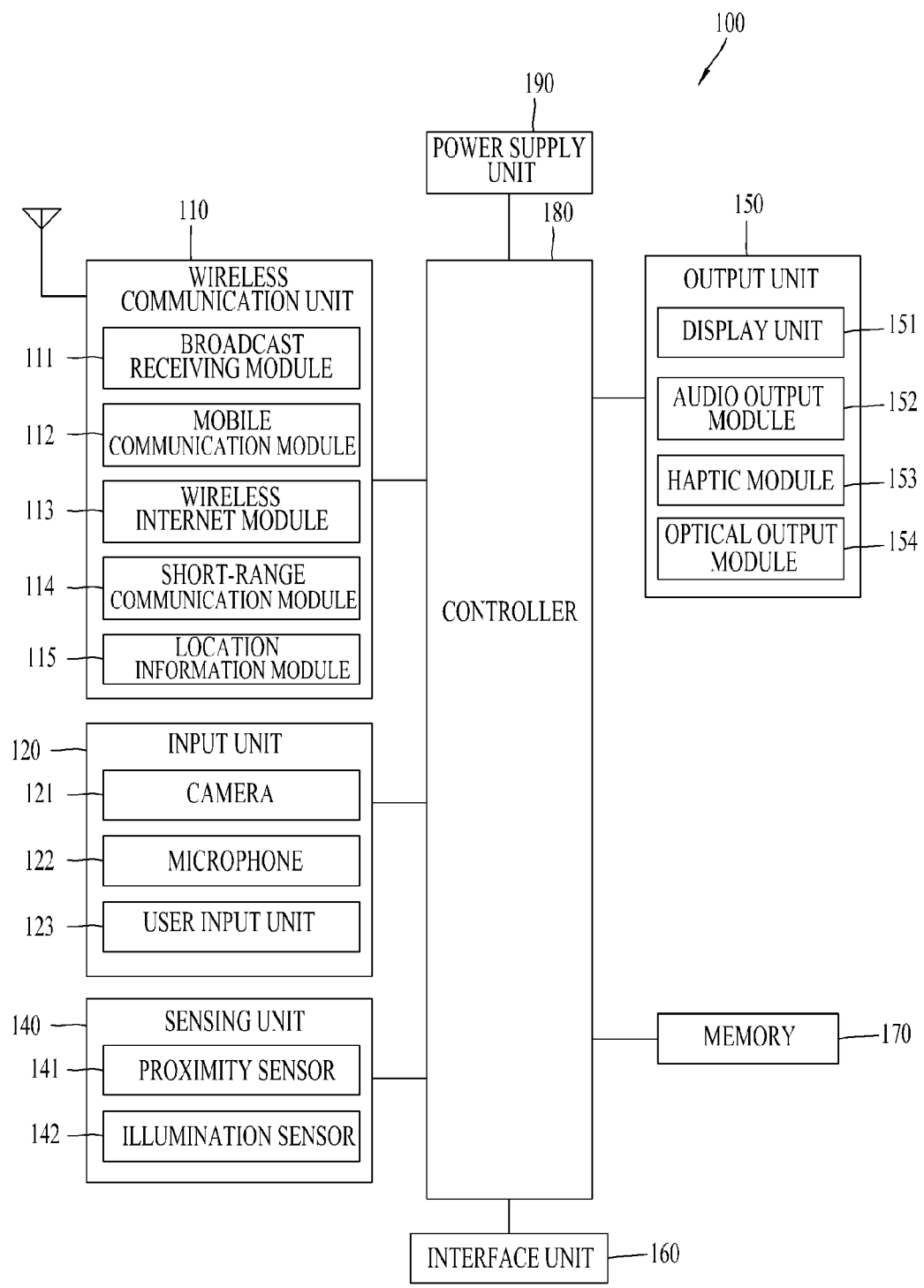
FIG. 1 is a block diagram illustrating one example of a mobile terminal in accordance with one embodiment of the present disclosure.

Different vibrations can be output in a manner of being synthesized together or can be output in sequence.

The haptic module 153 is able to generate various tactile effects as well as the vibration. For instance, the haptic module 153 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 153 can be implemented to enable a user to sense the tactile effect through a muscle sense of finger, arm or the like as well as to transfer the tactile effect through a direct contact. Optionally, at least two haptic modules 153 can be provided to the mobile terminal 100 in accordance with the corresponding configuration type of the mobile terminal 100.

The memory 170 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 170 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 is able to operate in association with a web storage for performing a storage function of the memory 160 on Internet.

The interface unit 160 is often implemented to couple the mobile terminal 100 with external devices. The interface unit 160 receives data from the external devices or is supplied with the power and then transfers the data or power to the respective elements of the mobile terminal 100 or enables data within the mobile terminal 100 to be transferred to the external devices.

The interface unit 160 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 100 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 may control the overall operations of the mobile terminal 100. For example, the controller 180 may performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface unit 160 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 170, and executed by a controller or processor, such as the controller 180.

Figure 2:
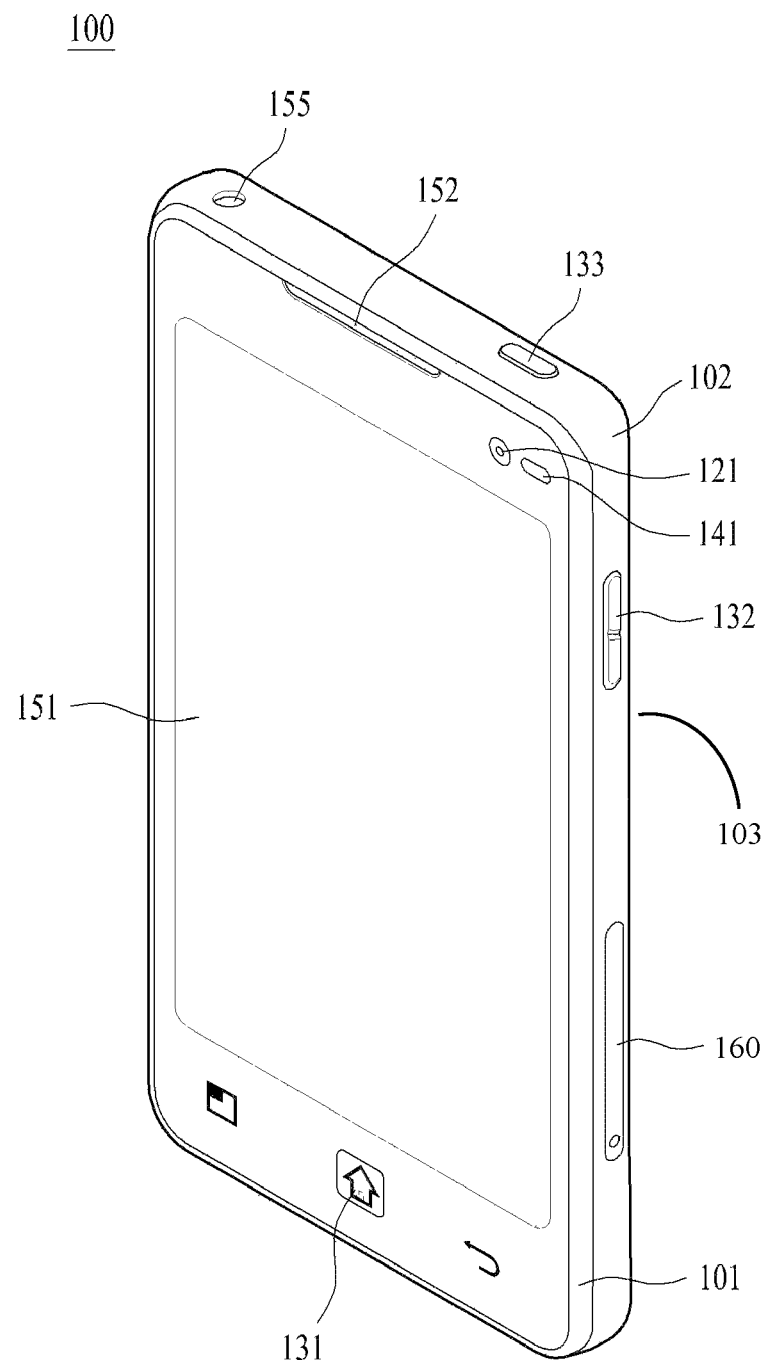
FIG. 2 is a perspective diagram illustrating one example of the mobile terminal in accordance with one embodiment of the present disclosure, viewed in front.

FIG. 2 is a perspective diagram of one example of a mobile terminal, viewed in front.

The illustrated mobile terminal 100 includes a bar-type terminal body. The examples presented herein are not limited to the bar type terminal body. The examples are applicable to diverse structures including a slide type, a folder type, a swing type, swivel type and the like. Those types have two or more bodies coupled to each other to relatively move.

The body of the mobile terminal 100 includes a case 101 and 102 defining an exterior appearance of the mobile terminal. In the illustrated example, the case may include a front case 101 and a rear case 102 cooperatively defining an inner space. The inner space formed between the front case 101 and the rear case 102 may accommodate various electronic components.

Other configurations are possible. For example, electronic components may be mounted in a surface of the rear case 102. Examples of the electronic components mounted in the surface of the rear case 102 include a battery loadable and unloadable by a user, a USIM card, a memory card and the like. In this instance, the rear case 102 may further include a back cover 103 for covering the surface. The back cover 103 may be configured as a detachable unit detached by the user easily and smoothly. When the back cover 103 is detached by the user, the surface of the rear case 102 is exposed.

The back cover 103 is attached to the rear case, a lateral surface of the rear case 102 may be partially exposed. When the back cover 103 is small, a rear surface of the rear case 102 may be also partially exposed. If covering an overall area of the rear surface of the rear case 102, the back cover 103 may have an opening for exposing the camera or the audio output module outside.

The case 101, 102 and 103 may be formed by injection-molding synthetic resin or made of metal, for example, stainless steel (STS) and titanium (Ti).

In the case 101 and 102 may be arranged a display unit 151, an audio output module 152, a camera 121, a user input unit 130, 131 and 132, a microphone 122, an interface unit 160 and the like.

The display unit 151 occupies most area of the front case 101. The audio output module 152 and the camera 121 are arranged in an area adjacent to one of ends of the display unit 151. The user input unit 131 and the microphone 122 are arranged in an area adjacent to the other end of the display unit 151. The user input unit 132, the interface unit 160 and the like are arranged in lateral surfaces of the front case 101 and the rear case 102. An ear jack 155 may be further provided in a predetermined area of the mobile terminal to connect an external sound output device such as an earphone by inserting a plug. A proximity sensor 141 is also shown.

The user input unit 130 is implemented for the user to input commands and the commands are processed by the controller to control the operation of the mobile terminal 100. The user input unit 130 may include a plurality of manipulation units 131, 132 and 133 and the plurality of the manipulation units 131, 132 and 133 may be called as a manipulating portion.

The information input by first and second manipulation units 131 and 132 may be diversely preset. For example, the first manipulation unit 131 is implemented for the user to input commands such as start, end, scroll and the like. The second manipulation unit 132 is implemented for the user to input commands such as volume adjusting of the sound output from the audio output module 152. The third manipulation unit 133 is implemented for the user to input commands such as touch recognition mode activation/deactivation of the display unit 151.

The manipulation units 131, 132 and 133 may be implemented in a form of a button type for recognizing inputs when the user applies a certain pressure. As an alternative example, the manipulation units 131, 132 and 133 may include a touch sensor for recognizing inputs by only using the user's touch.

The manipulation unit may emit light for the user to press the button of the manipulation unit even in a dark place. A light source 250 (FIG. 3) such as a light emitting diode (LED) is used even for an indicator configured to display a state of the mobile terminal 100. In this instance, if the light source 250 directly emits light forwards, a strong light might reach the user's eyes and it can be a disadvantage. Moreover, if the light source 250 is arranged in a direction to the thickness of the mobile terminal 100, there is another disadvantage of a thick mobile terminal 100.

To solve such disadvantages, a light guide unit for emitting light forwards uniformly may be used. However, a conventional light guide unit 10 is configured with various layers as mentioned above and has a disadvantage of a complex manufacturing process and another disadvantage of a high expense. A light guide unit 210 is formed in the form of injection molding and metal layer coating, thereby simplifying the structure of the light guide unit 210 and reducing the overall thickness, with a low manufacture cost.

Figure 3:
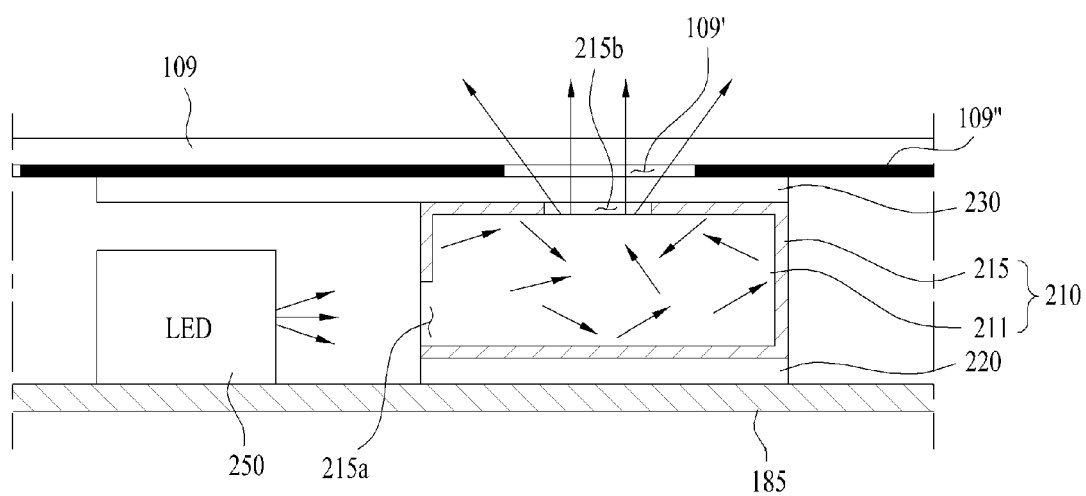
FIG. 3 is a sectional diagram illustrating a light guide unit of the mobile terminal in accordance with one embodiment of the present disclosure.
Figure 4:
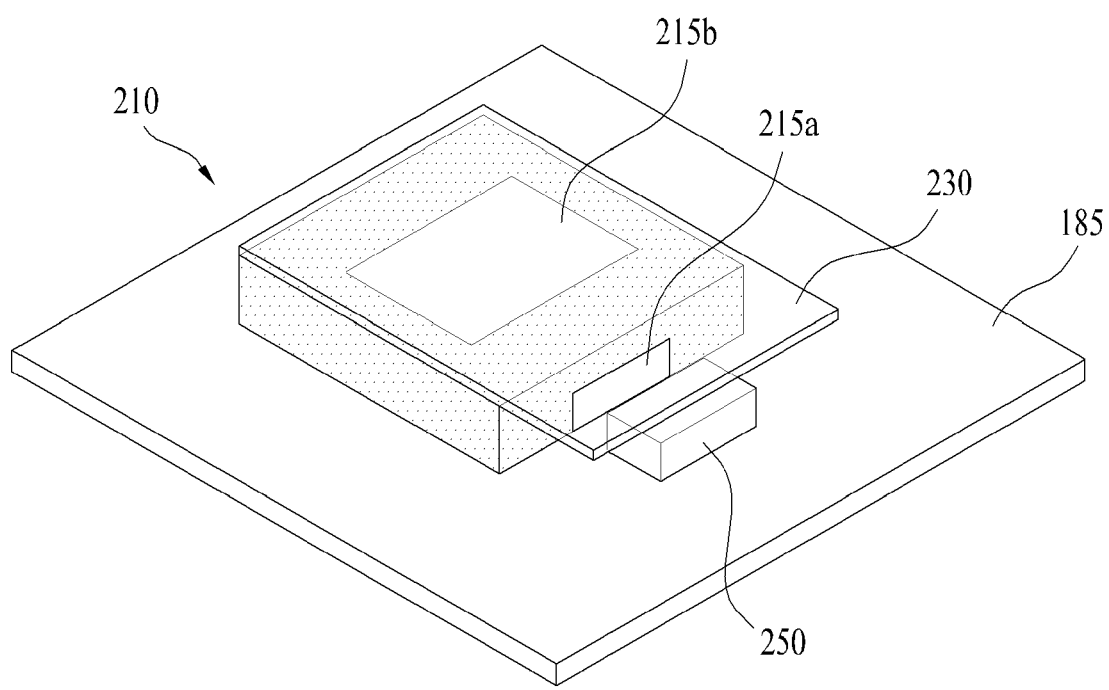
FIG. 4 is a perspective diagram of FIG. 3.

FIG. 3 is a sectional diagram illustrating a light guide unit of the mobile terminal in accordance with one embodiment of the present disclosure and FIG. 4 is a perspective diagram of FIG. 3.

Referring to FIGS. 3 and 4, the light guide unit 210 of the present disclosure may include a base module 211 made in the form of injection molding; and a reflection film 215 coated on a surface of the base module 211. The reflection film 215 has a first opening 215a formed in a lateral surface for light to be incident thereon from the light source 250 and a second opening 215b formed forwards. Accordingly, the light incident via the first opening 215a from the lateral surface may travel in the light guide unit 210 and reflects on the reflection film 215, to be emitted forwards via the second opening 215b.

Different from a conventional light guide unit, the lateral surface is blocked and the light escaped from the lateral surface is minimized enough to enhance efficiency of light guidance. Moreover, no auxiliary shielding film has to be provided to shield the light escaping via the lateral surface.

The reflection film 215 of the present disclosure is formed by coating a metallic material, for example, tin (SN) or aluminum (Al) in the form of Non-conductive Vacuum Metallization. In other words, the reflection film 215 is coated by Mon-conductive Vacuum Metallization and the polish of the reflection film 215 is improved such that the light incident on the lateral surface of the light guide unit 210 can be reflected as if reflected on a mirror. Non-conductive Vacuum Metallization may perform more glossy coating, compared with other coating methods, and enhance reflectivity.

A white sheet 230 is disposed on the light guide unit 210 and an adhesive tape 220 is attached to a backside of the light guide unit 210, thereby being disposed on the printed circuit board 185. The white sheet is functioned to scatter the light emitted from the light guide unit 210 and to change and emit the light into a soft light.

As shown in FIG. 4, the white sheet 230 is larger than the light guide unit 210 to cover even a top surface of the light source 250. The scattered light not incident on the light guide unit 210 may be prevented from emitting forwards directly.

A case 109 located in a front or forward direction where the second opening 215b is formed (an upper surface in the drawing) is configured as a light transmission unit 109' to emit the light. When a portion of the case facing the second opening 215b has a window glass 109, printing is partially performed and the light transmission unit 109' may be formed in a bezel 109" of the window glass 109 for light to transmit.

The base module 211 is formed by injection molding. The reflection film 215 is coated by the non-conductive vacuum metallization and disposed on the base module 211. After that, the reflection film 215 is partially removed by a laser etching method and the opening 215b is then formed. The injection molding method and the non-conductive vacuum metallization method may form a product with a large area easily, such that the production cost of the light guide unit 210 can be lowered.

Figure 5:
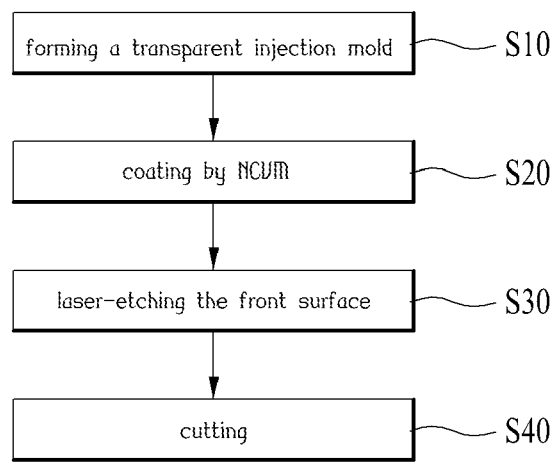
FIG. 5 is a flow chart illustrating a method for manufacturing a light guide unit in accordance with another embodiment of the present disclosure.

Hereinafter, a method for manufacturing the light guide unit 210 will be described, referring to FIGS. 5 through 9. FIG. 5 is a flow chart illustrating a method for manufacturing a light guide unit in accordance with another embodiment of the present disclosure. FIGS. 6 through 9 are diagrams illustrating one example of a method for manufacturing the light guide unit 210 according to FIG. 5.

Figure 6:
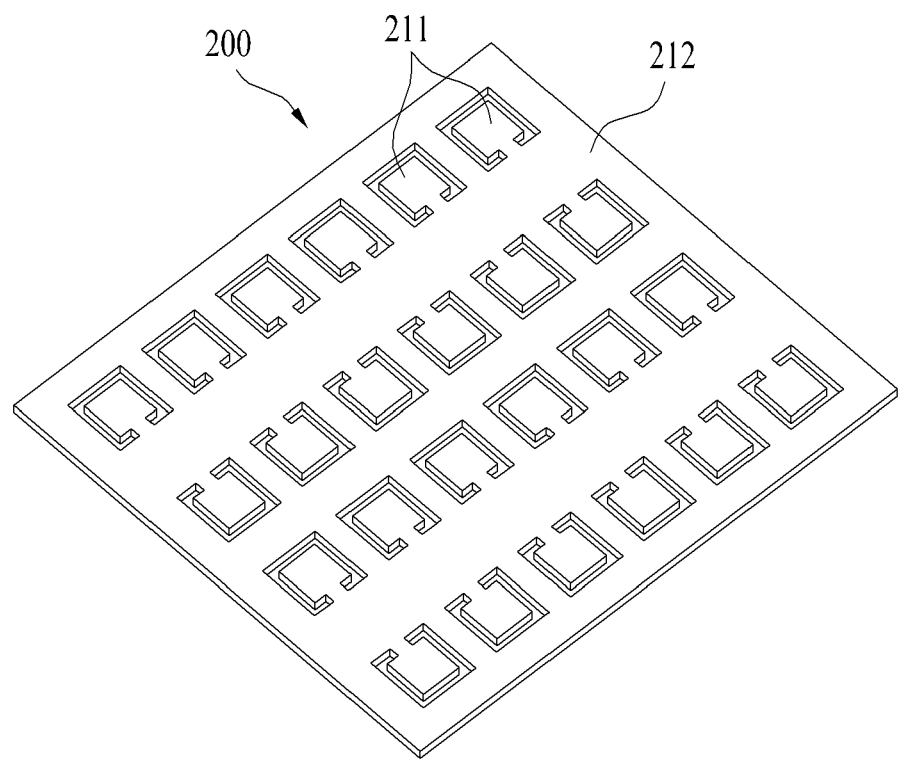
FIGS. 6 through 9 are diagrams illustrating one example of a method for manufacturing the light guide unit according to FIG. 5.

As shown in FIGS. 5 and 6, a transparent injection mold 200 having a plurality of base modules 211 is formed by the injection molding method (S10). The injection molding method injects and hardens injection solution in a mold. Mass production can be possible, using the injection molding. Several base modules 211 may be fabricated at one time, using the injection molding method as shown in FIG. 6.

Figure 7:
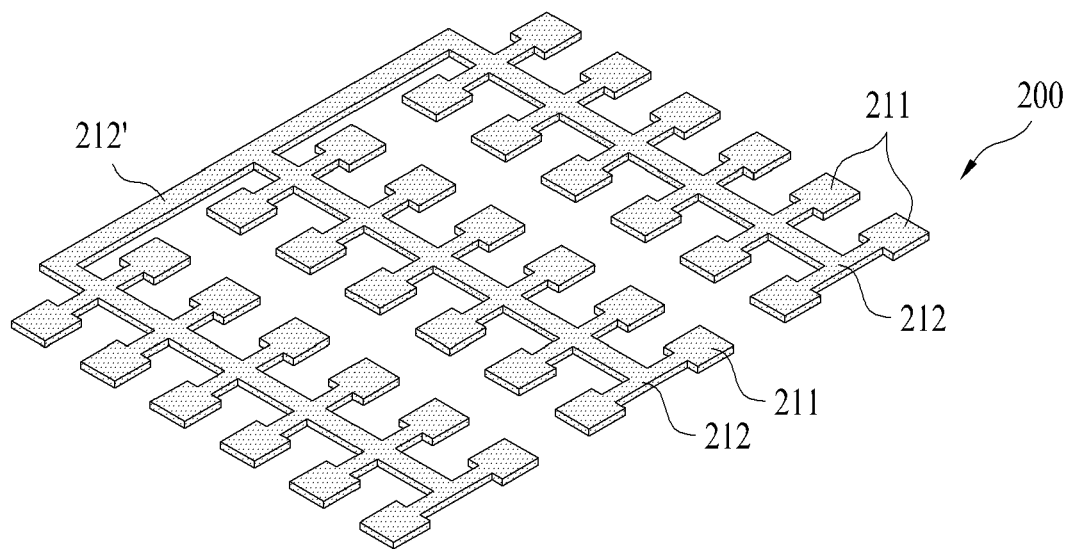

A temporary fixing unit 212 connecting the base modules 211 with each other may serve as a passage of the injection solution and the temporary fixing unit 212 is removed finally. Accordingly, the temporary fixing unit 212 is only connected to each of the base modules 211 and the appearance of the temporary fixing unit 212 is not limited. The temporary fixing unit may be formed in a rectangular shape of a plate as shown in FIG. 6 or in a shape of several bars as shown in FIG. 7.

The base modules 211 may be connected to right and left portions of the bar-shaped temporary fixing unit 212 like leaves hanging on a branch. Temporary fixing portions 212' may be further provided to connect several temporary units 212 with each other.

Figure 11:
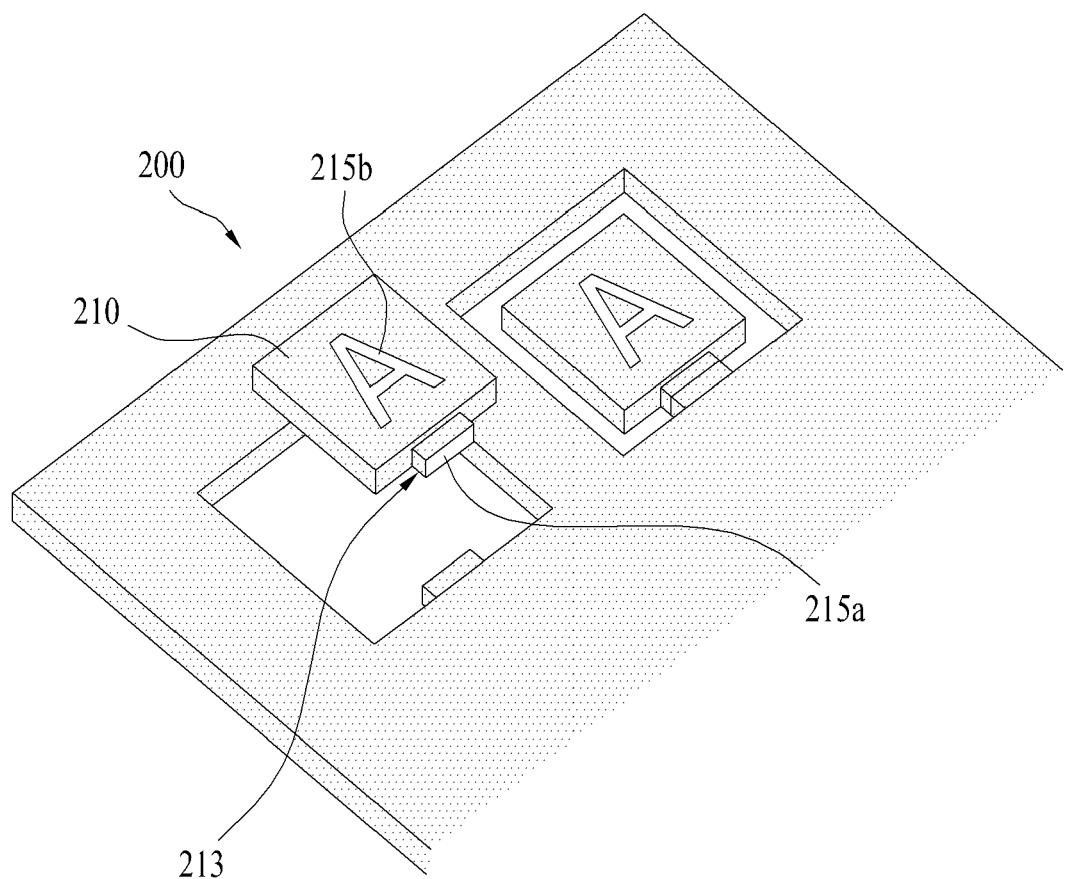

A connecting portion 213 for connecting the base modules 211 with the temporary fixing unit 212 may have a certain thickness which is equal to the thickness of the base module 211 and the temporary fixing unit 212 as shown in the example of FIG. 11. As an alternative example shown in FIG. 7, the connecting portion 213 may be thinner to enlarge the area of coating the reflection film 215 in a step of coating the reflection film 215 which will be described later.

The base modules 211 are used after separated from the temporary fixing unit 212. It is preferred that the base modules 211 are arranged in a line to cut away several base modules 211 at one time.

Figure 8:
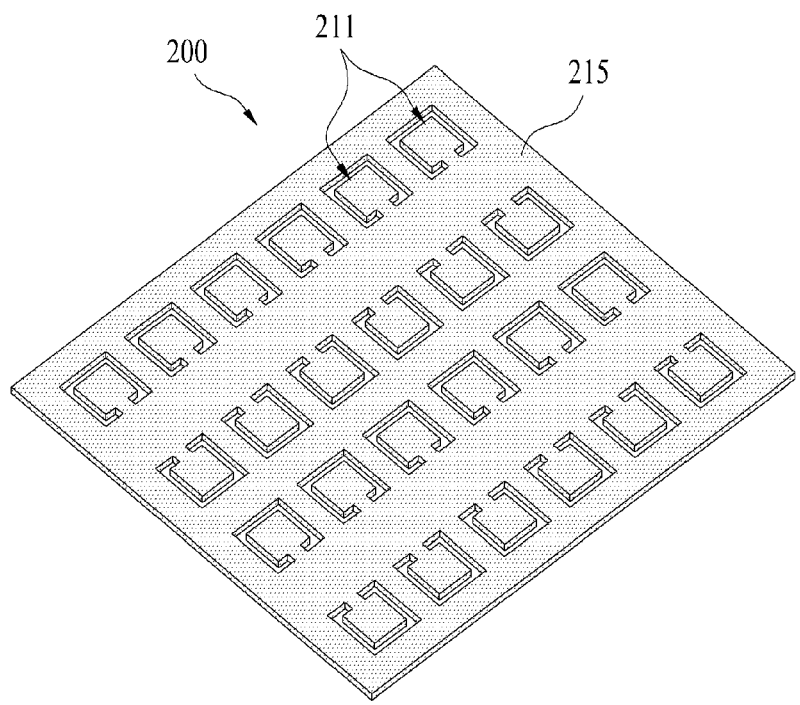

After the transparent injection mold 200 including the base module 211 and the temporary fixing unit 212 is injection-molded, tin or aluminum is coated by the non-conductive vapor metallization (NCVM) method and the reflection film 215 is formed (S20). As shown in FIG. 8, the non-conductive vapor metallization method enables the reflection film 215 coated on the overall area of the surface.

Accordingly, the reflection film 215 coated on the front surface is partially laser-etched to form the second opening 215b and the second opening 215b is formed (S30).

Figure 9:
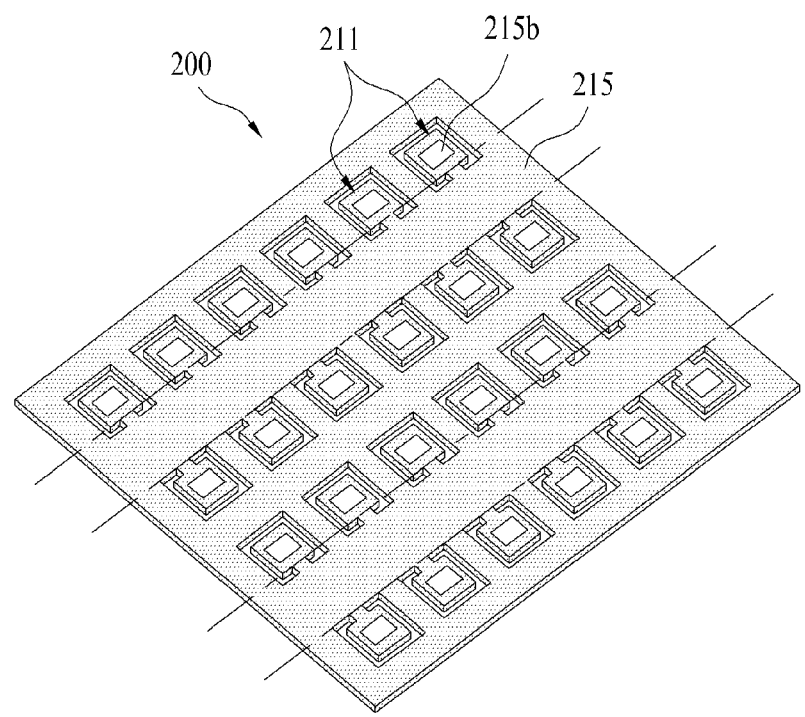

As an alternative example, the transparent injection mold 200 is injected to have a projected area corresponding to the second opening 215 and the reflection film 215 is coated. After that, the projected area is cut away and then the second opening 215b shown in FIG. 9 is formed. As another alternative example, only the area corresponding to the second opening 215b is shielded and the other area is coated to form the second opening 215b.

Figure 10:
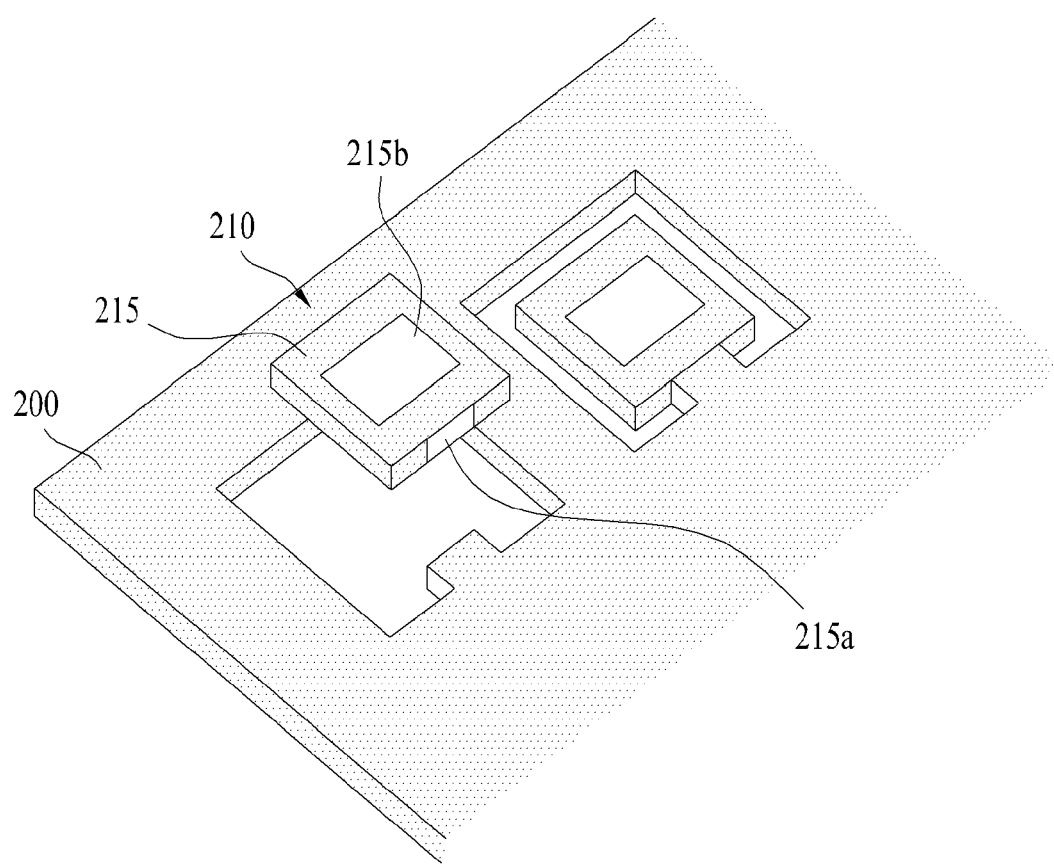
FIGS. 10 through 13 are perspective diagrams illustrating diverse examples of the light guide unit of the mobile terminal in accordance with one embodiment of the present disclosure.

After the second opening 215b is formed, each of the connecting portions 213 are cut away and then the light guide units 210 are fabricated one by one as shown in FIG. 10 (S40). As shown in FIG. 10, the first opening 215a may be formed in the surface having the connecting portion 213 cut away there from, without forming the reflection film 215.

Figure 12:
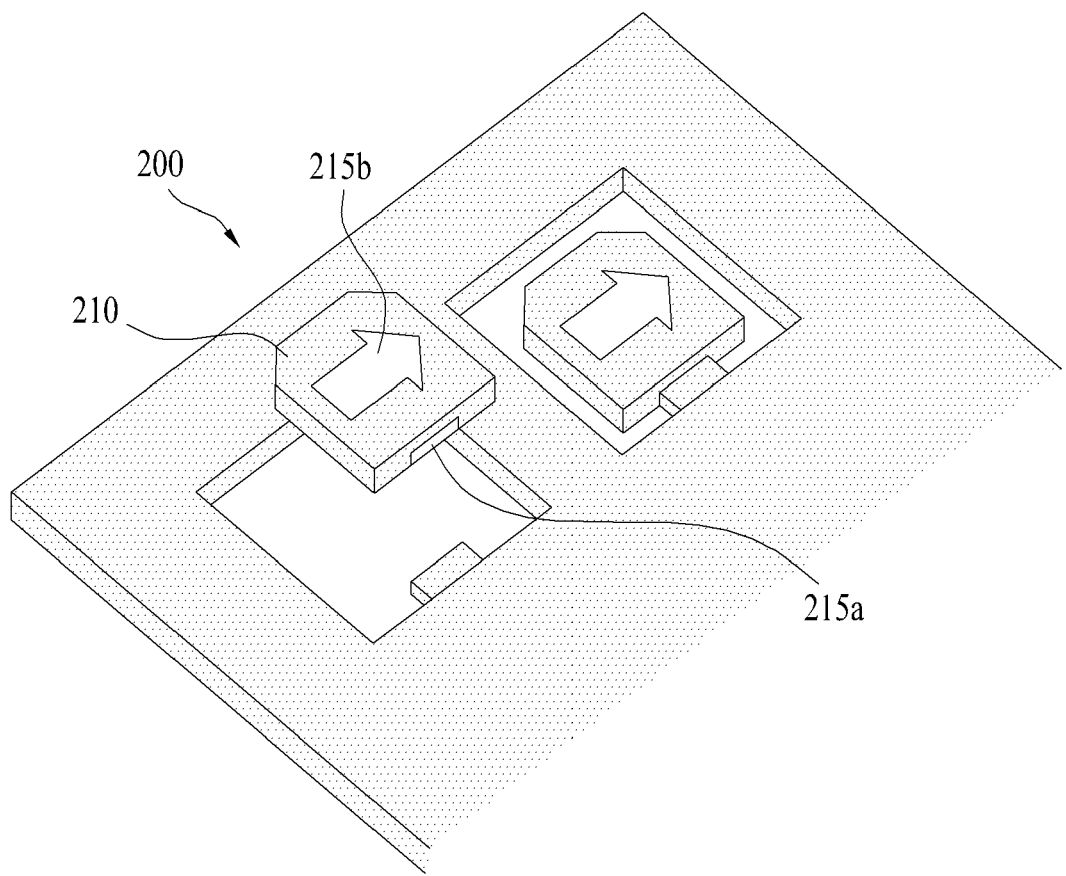

As shown in FIGS. 11 and 12, the second opening 215b may be formed in a shape of a character or a figure. When the connecting portion 213 is thinner than the base module 211 as shown in FIG. 7, the first opening 215a is less high than the light guide unit 210 as shown in FIGS. 11 and 12.

The light guide unit may be cut away close to the base module 211 as shown in FIG. 12 or it may be cut away only to leave the connecting portion 213 as shown in FIG. 11. A corner of the light guide unit 210 shown in FIG. 12 is cut away obliquely to form a dull angle. The light is not collected in the corners but induced to the second opening 215b.

Figure 13:
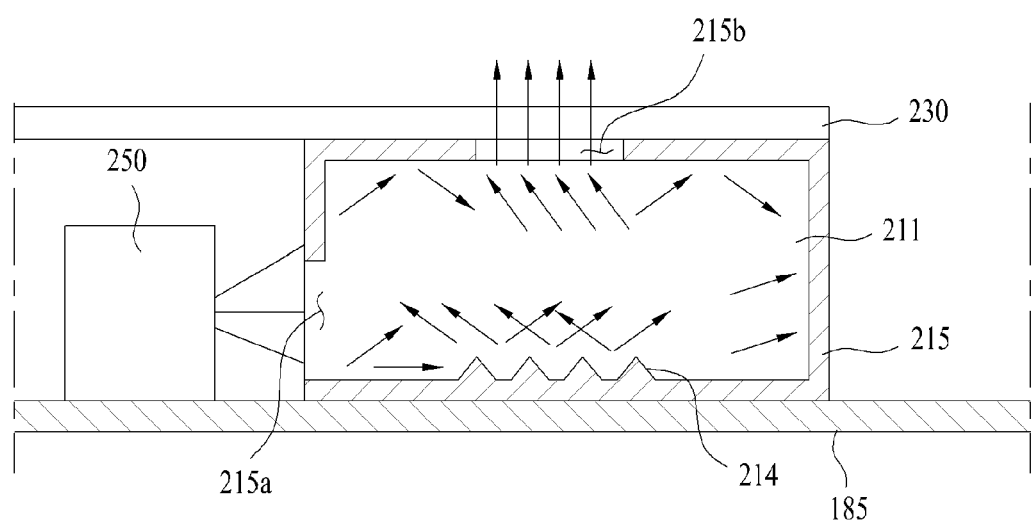
Figure 14:
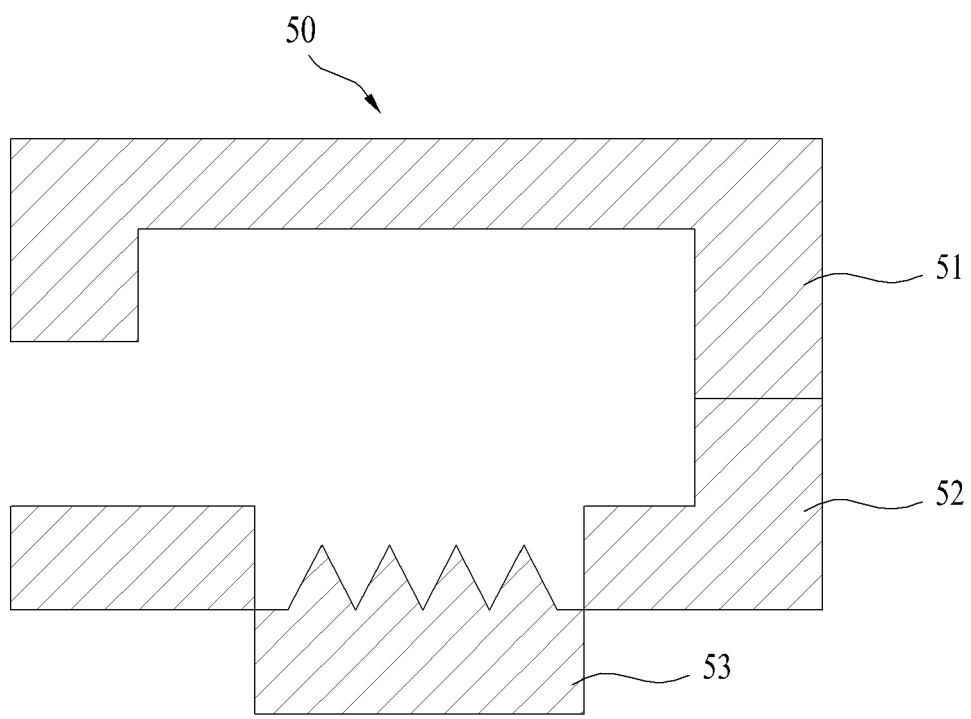
FIG. 14 is a sectional diagram illustrating a mold for manufacturing the light guide unit of FIG. 13.
Figure 15:
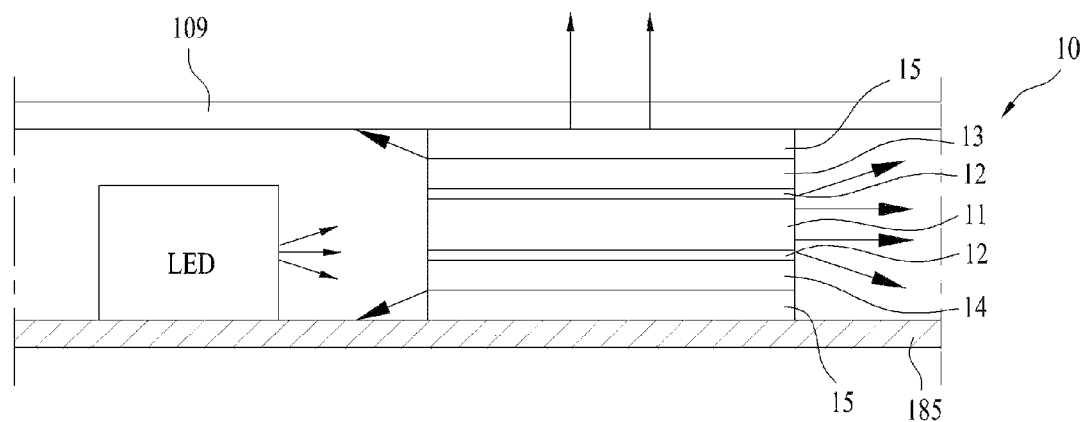
FIG. 15 is a sectional diagram illustrating a conventional light guide unit.

An uneven portion 214 may be formed in a bottom of the base module 211 shown in FIG. 13. When the uneven portion 214 is formed in the bottom of the base module 211, the light is scattered to the front surface (or forwards) and guided toward the second opening 215b. The uneven portion 214 formed in the bottom of the base module 211 may be formed by forming unevenness in the mold 50 in the injection molding. At this time, the unevenness of the mold 50 may be a replaceable type shown in FIG. 14 illustrating a cross section of the mold 50 to fabricate the light guide unit 210 of FIG. 13.

The light guide unit 210 manufactured in the method described above is fixed to the printed circuit board 185, using the double-sided tape 220, as shown in FIG. 3. The light guide unit 210 may be mounted to have the second opening 215b toward the light transmission unit 109' of the case of the mobile terminal 100. In case the light transmission unit 109' is functioned as the user input unit 130, a touch sensor may be further provided in the back side of the window glass 109.

As described above, according to one or more of the embodiments of the present disclosure, the reflection film 215 may cover even the lateral surface of the light guide unit and even the light escaping in a lateral direction may be guided. Moreover, no adhesive layer needs to be disposed and the processes may be simplified. The overall thickness of the light guide unit can be reduced and the plurality of the light guide units 210 may be manufactured at one time. Accordingly, the production cost can be lowered.

Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
   a case having electronic components mounted therein and a light transmission portion;
   a light source arranged in the case and emitting light in a lateral direction; and
   a light guide unit having a lateral side, the light emitted from the light source incident on the lateral side,
   wherein the light guide unit comprises:
   a base module; and
   a reflection film coated on an outer surface of the base module,
   wherein the reflection film comprises:
   a first opening formed in a surface facing the light source; and
   a second opening formed toward a front surface of the light guide unit and facing the light transmission portion of the case, and
   wherein the reflection film is formed by coating tin or aluminum in a non-conductive vapor metallization (NCVM) method,
   wherein the light guide unit has an area projected in a direction corresponding to the second opening of the reflection film, and
   wherein a height of the first opening formed in the reflection film is smaller than a height of the light guide unit.

2. The mobile terminal of claim 1, wherein a plurality of uneven portions are formed in a bottom surface of the light guide unit.

3. The mobile terminal of claim 1, wherein one or more of the second opening and the light transmission portion are formed in a character or a figure shape.

4. The mobile terminal of claim 1, further comprising:
   a white sheet disposed between a front surface of the light guide unit and the light transmission portion.

5. The mobile terminal of claim 1, wherein one or more of the corners of the light guide unit are cut away obliquely.

6. A method for manufacturing a plurality of light guide units, the method comprising:
   injection-molding a transparent injection mold including a fixing frame and a plurality of base modules having one surface of which a predetermined portion is connected to the fixing frame and other surfaces exposed outside;
   coating a reflection film on a surface of the transparent injection mold;
   partially removing the reflection film formed in a front surface of the transparent injection mold; and
   cutting away connecting portions between the base modules and the fixing frame,
   wherein the injection-molding includes injecting injection solution to a mold having a cavity formed corresponding to a shape of the transparent injection mold.

7. The method for manufacturing the plurality of the light guide units of claim 6, wherein a corresponding connecting portion is thinner than a corresponding base module.

8. The method for manufacturing the plurality of the light guide units of claim 6, wherein the plurality of the base modules are arranged in a line.

9. The method for manufacturing the plurality of the light guide units of claim 6, wherein the fixing frame is a bar type, and
   wherein the plurality of the base modules are connected to right and left portions of the fixing frame.

10. The method for manufacturing the plurality of the light guide units of claim 6, wherein a plurality of unevenness are formed in the mold, corresponding to uneven portions formed in a bottom surface of a corresponding base module.

11. The method for manufacturing the plurality of the light guide units of claim 8, wherein the mold is a detachable assembly mold having the unevenness detachable therefrom.

12. The method for manufacturing the plurality of the light guide units of claim 6, wherein the coating the reflection film coats tin or aluminum according to a non-conductive vapor metallization (NCVM) method.

13. The method for manufacturing the plurality of the light guide units of claim 6, wherein the partially removing the reflection film is performed according to laser etching.

14. A method for manufacturing a mobile terminal, the method comprising:
   injection-molding a transparent injection mold including a fixing frame and a plurality of base modules having one surface of which a predetermined portion is connected to the fixing frame and other surfaces exposed outside;
   coating a reflection film on a surface of the transparent injection mold;
   partially removing the reflection film formed in a front surface of the transparent injection mold;

forming a light guide unit by cutting away connecting portions between the base modules and the fixing frame;

disposing a light source facing a cut-away portion of the light guide unit to make a laser-processed portion toward the front surface; and coupling a front case to a rear case to locate a light transmission portion in the laser-processed portion, wherein the injection-molding includes injecting injection solution to a mold having a cavity formed corresponding to a shape of the transparent injection mold.

* * * * *